July 27, 1926.
S. S. AMDURSKY
1,593,618
REGULATING APPARATUS
Filed Feb. 6, 1926.
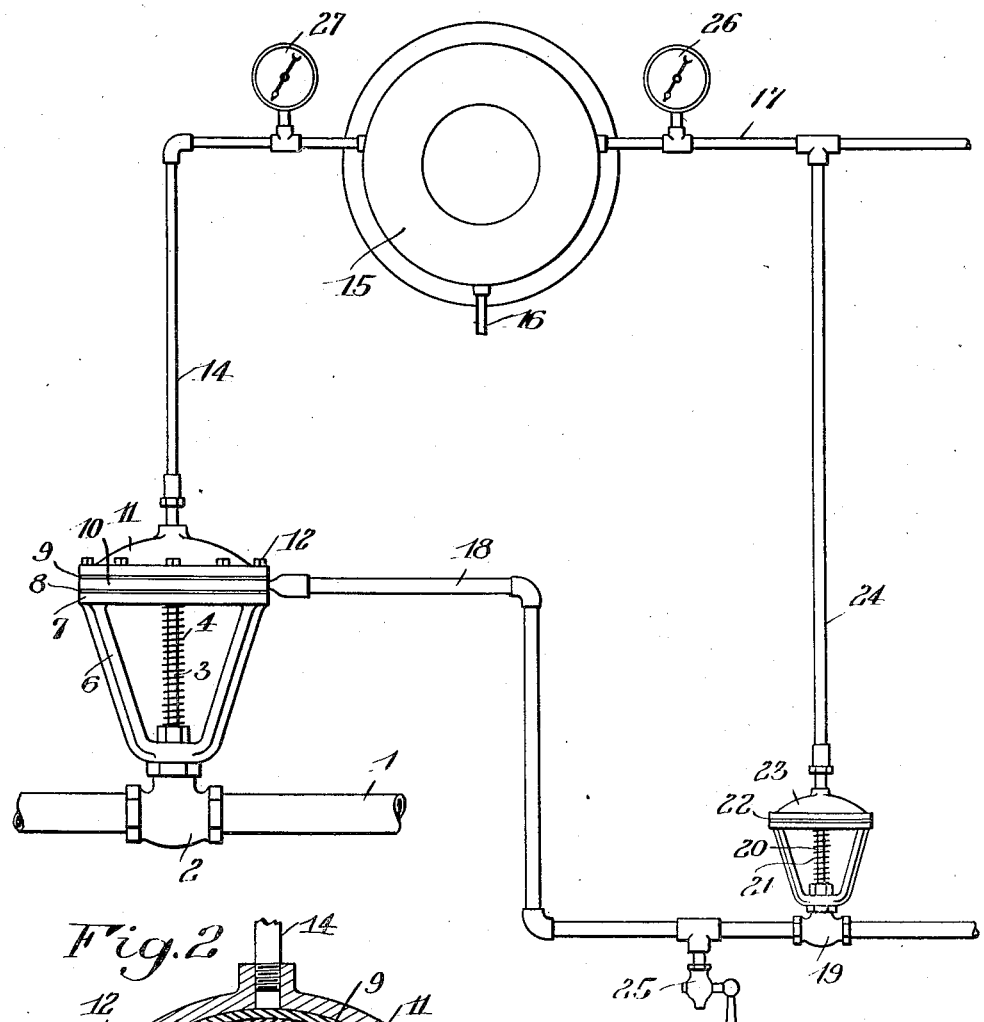
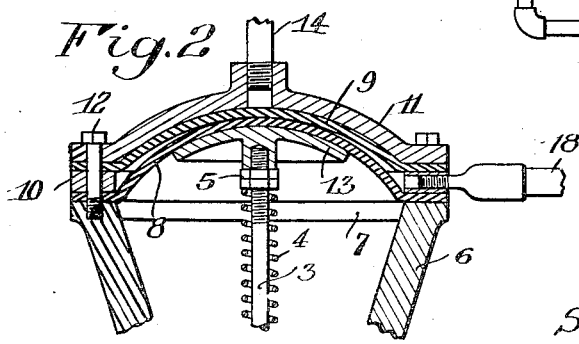
INVENTOR
Samuel S. Amdursky
BY
his ATTORNEYS Patented July 27, 1926.                                            1,593,618

UNITED STATES PATENT OFFICE.

SAMUEL S. AMDURSKY, OF ROCHESTER, NEW YORK, ASSIGNOR TO TAYLOR INSTRUMENT COMPANIES, OF ROCHESTER, NEW YORK, A CORPORATION OF NEW YORK.

REGULATING APPARATUS.

Application filed February 6, 1926. Serial No. 86,626.

This invention relates to regulating apparatus, and more particularly to safety shut-off features of such apparatus. In various uses of regulating apparatus, the failure of the controlling element or medium might result in a considerable loss, and it is therefore desirable to avoid the possibilities of such loss. For example, in apparatus supplied with steam or a heated fluid, such as in the curing of tires, pasteurizing of milk, the heating of dry kilns, etc., if the steam should remain on for too long a time the material in the ovens might be heated for too long a time or injured so as to be worthless.

An object of this invention is to provide an improved regulating apparatus for controlling a supply conduit, with which in the event of failure of the controlling medium, a closing of the supply conduit will automatically take place and continue, until the controlling medium again becomes effective; and which will be relatively simple, dependable, durable and inexpensive.

Various other objects and advantages will be apparent from the following description of an embodiment of the invention, and the novel features will be particularly pointed out hereinafter in connection with the appended claims.

In the accompanying drawing:

Figure 1 is a diagram of a regulating apparatus constructed in accordance with the invention;

Figure 2 is a sectional elevation through the head of the double diaphragm valve for controlling the supply conduit.

In the illustrated application of the invention, the supply conduit 1 carries a controlling valve 2 of the type having a reciprocating stem 3 which is normally biased to open position by a suitable spring 4 surrounding the stem and acting between a collar 5 of the stem and the valve casing. This stem 3 is controlled by a double diaphragm valve head of any suitable construction. For example, the valve casing may be provided with a plurality of arms 6 which extend outwardly in divergent relation to the stem, the outer ends of the arms being connected by a ring 7. A pair of diaphragms 8 and 9 are disposed upon the end face of the ring 7, with a spacing ring 10 interposed between the two diaphragms. A dome-shaped cap 11 is disposed against the outer face of the upper diaphragm 9 and secured to the ring 7 by suitable means, such as by bolts or screws 12 which pass through the cap and spacing rings 10 and interlock with the ring 7. The stem 3 of the valve extends through ring 7 and carries at its free end a head 13, engaging with the lower diaphragm 8, and normally holding both diaphragms in their upper positions, as shown in Figure 2, when the valve is in open position. The diaphragms may be made of any suitable material, such as various flexible rubbers or leather, and are preferably bowed, as shown in Figure 2, so that when either diaphragm is subjected to pressure from either face it may move to a reverse bowed position without material stretching.

A controlling pipe 14 is threaded into the cap 11 so as to communicate with the interior of the diaphragm head. The controlling pipe 14 is connected to a suitable controlling device or regulator 15 of any suitable or desired type, such as a thermostatic time regulator, for example. Such regulators are well-known in the art and therefore a detailed description is omitted in order to avoid confusion in the present application. Such regulators may have a tube 16 running to an oven or other apparatus in which the temperature is to be controlled and by connection to suitable apparatus within or associated with the element the regulator 15 is operated by the connection 16 thereto to establish or break communication with the pipe 14. These regulators are also frequently provided with a time control which acts jointly with the thermostatic control, so as to cut off the supply conduit after a selected length of time, altho leaving the conduit subject to the thermostatic control during such selected duration of time. A pipe 17 leading from a suitable source of fluid under pressure, such as air, is connected to the regulator 15, and the latter controls the admission of such compressed fluid to the pipe 14 for the purpose of controlling the valve 2.

When the regulator establishes communication between the pipes 14 and 17, the compressed fluid will pass into the diaphragm head between the cap 11 and the upper diaphragm 9, and will force the diaphragm downwardly and depress the stem 3 against the casing of the spring 4 and thus close the valve 2. The steam supplied to the oven or other apparatus by conduit 1 will then be cut off until the pressure in the diaphragm head is released by the regulator 15.

It will be obvious that since the regulator 15 is dependent, for its control of the supply conduit, upon a compressed fluid, a failure of the supply of compressed fluid would prevent the closing of the supply conduit valve at the proper time or at the proper temperature under the control of the regulator 15. In order to provide a safety control for the supply conduit valve, a pipe 18 is connected through the spacing ring 10 to the space between the two diaphragms 8 and 9. This pipe 18 is also connected to a suitable source of fluid conducted to pipe 17. For example, the pipe 18 may be connected to water under pressure, such as to a domestic water supply system. A valve 19 in the pipe 18 controls the passage of water to the space between the diaphragms, and is normally biased to open position. The stem 20 of the valve 19 is spring pressed to open position by a spring 21 which surrounds the stem and acts between the casing and a head on the stem, as usual in diaphragm controlled valves. The outer or head end of the stem engages beneath a diaphragm 22 secured across the cap 23 of the diaphragm head. A branch pipe 24 is connected from the air supply pipe 17 to the space between the cap 23 and the diaphragm 22, so as to normally force the diaphragm downwardly and through it force the valve stem 20 into closed position.

A pet cock 25 may be provided in pipe 18 between the valve 19 and the double diaphragm valve controlling the steam supply conduit. This pet cock is preferably left slightly open so that any water remaining in the pipe 18 between the two diaphragm controlled valves can drain out. Suitable pressure gauges 26 and 27 may be provided in the pipes 14 and 17 for indicating the pressure in those pipes at any time.

In the operation of regulating apparatus such as illustrated, let it be assumed that the supply conduit 1 conducts steam to an oven and that the regulator 15 is controlled jointly by the temperature conditions in the oven and by suitable time apparatus. Let it be also assumed that the pipes 17 and 18 are connected respectively, to sources of air and water under pressure. The pressure of the air in the pipe 17 will extend through the pipe 24 to the diaphragm head controlling the valve 19 and normally hold the valve 19 closed. The space between the two diaphragms 8 and 9 of the double diaphragm head will be vented by the pet cock 25, and the two diaphragms will be held face to face in their upper position by the stem 3 and the pressure of the spring 4. The valve 2 will thus be normally open and steam will pass to the oven.

The regulator 15, after the temperature in the oven reaches a predetermined maximum will operate to connect the pipes 17 and 14, and compressed air will be admitted against the upper face of the diaphragm 9 and cause a depression of the stem 3 which closes the valve 2 and shuts off the supply of steam to the oven. Thus, the temperature of the oven will be maintained uniform automatically, and after a predetermined length of time the regulator will also cause a connection of pipes 14 and 17 so as to admit compressed air to the pipe 14 independently of the thermostatic control, and thus completely shut off the steam supply valve 2.

In the event that the supply of compressed air in the pipe 17 should fail, the pressure in the pipe 24 will fall and the spring 21 will open the valve 19. Thereupon water under pressure will pass through the pipe 18 to the space between the two diaphragms 8 and 9 and cause a separation of the two diaphragms. Inasmuch as the upper diaphragm 9 lies against the cap 11, the pressure will force the lower diaphragm 8 downwardly and depress the stem 3, thus shutting off the steam supply as long as the compressed air failure continues. This prevents any possibility of damage resulting from a failure to shut off the steam supply at the proper time or keep it shut off through the failure of the operating fluid. Upon a return of the compressed fluid to the pipe 17, the valve 19 will be again automatically closed, which shuts off the supply of water to the double diaphragm valve head.

Since the pet cock is preferably slightly open, it will permit of the escape of the water slowly from the section of the pipe 18 between the valve 19 and the double diaphragm head, and permit an opening of the valve 2. The pet cock is not open sufficiently to allow all of the water entering the pipe 18 to escape. This drip of the water is insignificant, for the reason that it occurs only at infrequent intervals during failure of the main controlling medium, to wit, the compressed air in the pipe 17.

It will be obvious that various changes in the details, which have been herein described and illustrated in order to explain the nature of the invention, may be made by those skilled in the art within the principle and scope of the invention as expressed in the appended claims.

I claim:

1. Regulating apparatus comprising a supply conduit to be controlled, a double diaphragm valve controlling said conduit and spring pressed into open position, two separate sources of fluid under pressure connected separately to said valve to operate it to closed position when fluid from either source is conducted thereto, a primary controlling device for controlling the passage of fluid from one source to said valve, and means for controlling the passage of fluid from the other source to said valve, said last named means being controlled by said one source of fluid, whereby upon a failure of said one source of fluid, fluid from the other source will be admitted directly to said valve to close it automatically.

2. Regulating apparatus comprising a supply conduit to be controlled, a double diaphragm valve controlling said conduit and spring pressed into open position, two separate sources of fluid under pressure connected separately to said valve to operate it to closed position when fluid from either source is conducted thereto, a primary controlling device for controlling the passage of fluid from one source to said valve, and means for controlling the passage of fluid from the other source to said valve, said last named means being controlled by said one source of fluid, whereby upon a failure of said one source of fluid, fluid from the other source will be admitted directly to said valve to close it automatically and independently of the said primary controlling device.

3. Regulating apparatus comprising a supply conduit to be controlled, a valve controlling said conduit and spring pressed into open position and operable into closed position by fluid under pressure from separate sources two separate sources of fluid under pressure and including pipes connected to said valve to close it when fluid from either source is allowed to pass thereto, a primary controlling device included in the pipe from one fluid source for controlling the operation of said valve, a pressure operated valve in the pipe from the other fluid source for controlling the passage of fluid from that source to said first valve spring pressed to open position and operable by fluid pressure into closed position, a connection between the said one fluid source and said pressure operated valve for forcing the latter into closed position while fluid under pressure is available to said primary controlling device for controlling said conduit valve, whereby upon a failure of said one source of fluid under pressure, the pipe valve will be released and allowed to open so as to admit fluid from said other source to said conduit to close it during the continuance of failure of said one fluid source and to release it automatically when fluid from said one source again becomes available.

4. Regulating apparatus comprising a supply conduit to be controlled, a valve controlling said conduit and spring pressed into open position and operable into closed position by fluid under pressure from separate sources two separate sources of fluid under pressure and including pipes connected to said valve to close it when fluid from either source is allowed to pass thereto, a primary controlling device included in the pipe from one fluid source for controlling the operation of said valve, a pressure operated valve in the pipe from the other fluid source for controlling the passage of fluid from that source to said first valve spring pressed to open position and operable by fluid pressure into closed position, a connection between the said one fluid source and said pressure operated valve for forcing the latter into closed position while fluid under pressure is available to said primary controlling device for controlling said conduit valve, whereby upon a failure of said one source of fluid under pressure, the pipe valve will be released and allowed to open so as to admit fluid from said other source to said conduit to close it during the continuance of failure of said one fluid source and to release it automatically when fluid from said one source again becomes available, the chamber formed in said conduit valve and the pipe from the second source between the pressure operated valve and the conduit valve, being vented to release the pressure after fluid from said other source to said conduit valve is cut off.

5. Regulating apparatus comprising a conduit to be controlled, a double diaphragm valve controlling said conduit and yieldingly biased to open condition, the pipe connections from separate sources of compressed fluid to said valve enabling its operation into closed condition by fluid pressure independently through either pipe connection, one of said pipe connections having therein a pressure operated valve yieldingly biased to open condition and pressure operated to closed condition, a branch pipe connection between said pressure operated valve and the other of said pipe connections whereby said pressure operated valve will be normally held closed during the presence of a fluid under pressure in said other of the connections, and a primary controlling device in said one of the pipe connections between the branch pipe connection and the double diaphragm valve whereby said conduit will be normally under the control of said primary controlling device, and removed therefrom and the conduit closed automatically upon failure of a fluid under pressure in said other of the pipe connections.

6. Regulating apparatus comprising a conduit to be controlled, a double diaphragm valve controlling said conduit and yieldingly biased to open condition, pipe connections from separate sources of compressed fluid to said valve enabling its operation into closed condition by fluid pressure independently through either pipe connection, one of said pipe connections having therein a pressure operated valve yieldingly biased to open condition and pressure operated to closed condition, a branch pipe connection between said pressure operated valve and the other of said pipe connections whereby said pressure operated valve will be normally held closed during the presence of a fluid under pressure in said other of the connections, and a primary controlling device in said one of the pipe connections between the branch pipe connection and the double diaphragm valve, whereby said conduit will be normally under the control of said primary controlling device, and removed therefrom and the conduit closed automatically upon failure of a fluid under pressure in said other of the pipe connections, the chamber formed in said double diaphragm valve and adjacent section of said one of the pipe connections being vented to effect a release of the pressure in said double diaphragm valve caused by an opening and subsequent closing of said pressure operated valve.

SAMUEL S. AMDURSKY.